United States Patent
Shi et al.

(10) Patent No.: US 11,368,297 B2
(45) Date of Patent: Jun. 21, 2022

(54) METHOD AND APPARATUS FOR UPDATING DIGITAL CERTIFICATE

(71) Applicant: Beijing Baidu Netcom Science and Technology Co., Ltd., Beijing (CN)

(72) Inventors: Huangjun Shi, Beijing (CN); Liguo Duan, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 331 days.

(21) Appl. No.: 16/564,057

(22) Filed: Sep. 9, 2019

(65) Prior Publication Data

US 2020/0204369 A1    Jun. 25, 2020

(30) Foreign Application Priority Data

Dec. 19, 2018 (CN) .......................... 201811555764.1

(51) Int. Cl.
*H04L 9/08* (2006.01)
*H04L 9/32* (2006.01)
(Continued)

(52) U.S. Cl.
CPC .......... *H04L 9/0891* (2013.01); *H04L 9/0643* (2013.01); *H04L 9/0894* (2013.01);
(Continued)

(58) Field of Classification Search
CPC ... H04L 9/0891; H04L 9/3263; H04L 9/0643; H04L 9/0894; H04L 67/141; H04L 67/28;
(Continued)

(56) References Cited

U.S. PATENT DOCUMENTS

| 10,708,256 B1* | 7/2020 | Kane-Parry ........... H04L 63/061 |
| 2002/0184493 A1* | 12/2002 | Rees ..................... H04L 9/3263 713/158 |

(Continued)

FOREIGN PATENT DOCUMENTS

| CN | 101465732 A | 6/2009 |
| CN | 103501230 A | 1/2014 |

(Continued)

OTHER PUBLICATIONS

Zhen et al., A new validation solution for digital certificate, Journal of Shandong University of Technology (Natural Science Edition) 2017, pp. 57-60, vol. 31:4.

*Primary Examiner* — Mohammad W Reza
(74) *Attorney, Agent, or Firm* — The Webb Law Firm

(57) ABSTRACT

Embodiments of the present disclosure disclose a method and apparatus for updating a digital certificate. A specific embodiment of the method includes: receiving digital certificate data, the digital certificate data including a number of times of forwarding and a first forwarding moment; determining whether the following conditions are satisfied: the number of times of the forwarding being less than a preset threshold, or a time length between a current moment and the first forwarding moment being less than a preset time length; and increasing, in response to determining at least one of the conditions being satisfied, the number of times of the forwarding by a preset number, and forwarding the digital certificate data to another proxy server.

15 Claims, 6 Drawing Sheets

(51) Int. Cl.
*H04L 9/06* (2006.01)
*H04L 67/141* (2022.01)
*H04L 67/56* (2022.01)
*H04L 67/02* (2022.01)
*H04L 67/01* (2022.01)

(52) U.S. Cl.
CPC .......... *H04L 9/3263* (2013.01); *H04L 67/141* (2013.01); *H04L 67/28* (2013.01); *H04L 67/02* (2013.01); *H04L 67/42* (2013.01); *H04L 2209/76* (2013.01)

(58) Field of Classification Search
CPC ..... H04L 67/02; H04L 2209/76; H04L 67/42; H04L 63/061; H04L 63/0823; H04L 67/14
See application file for complete search history.

(56) References Cited

U.S. PATENT DOCUMENTS

| | | | |
|---|---|---|---|
| 2007/0209077 A1* | 9/2007 | Kitani | G11B 20/00086 726/26 |
| 2009/0235069 A1* | 9/2009 | Sonnega | H04L 63/062 713/156 |
| 2017/0277872 A1 | 9/2017 | Mercury et al. | |
| 2018/0123802 A1 | 5/2018 | Graul et al. | |
| 2020/0127854 A1* | 4/2020 | Mandava | H04L 9/3268 |

FOREIGN PATENT DOCUMENTS

| | | |
|---|---|---|
| CN | 103701781 A | 4/2014 |
| CN | 108270610 A | 7/2018 |

\* cited by examiner

METHOD AND APPARATUS FOR UPDATING DIGITAL CERTIFICATE

CROSS-REFERENCE TO RELATED APPLICATION

This application claims priority to Chinese Application No. 201811555764.1 filed Dec. 19, 2018, the disclosure of which is hereby incorporated by reference in its entirety.

TECHNICAL FIELD

Embodiments of the present disclosure relate to the field of computer technology, and specifically to a method and apparatus for updating a digital certificate.

BACKGROUND

An SSL (secure socket layer) provides a secure connection for an HTTP (hyper text transfer protocol), which greatly improves the security problem of the World Wide Web. The SSL negotiates a session parameter between a client and a server through a handshake process, and establishes an SSL session. An HTTP service requires a service end to present a valid digital certificate conforming to a domain name requested by a user in the SSL session. However, the period of validity of an SSL certificate is usually one year, which means that the digital certificate needs to be replaced every year. Alternatively, the digital certificate also needs to be replaced when a certificate issuer is no longer trusted by companies of the browser kernel. For a distributed system, it is a great challenge to efficiently and rapidly complete the update of digital certificates of all service ends.

SUMMARY

Embodiments of the present disclosure propose a method and apparatus for updating a digital certificate.

In a first aspect, some embodiments of the present disclosure provide a method for updating a digital certificate. The method includes: receiving digital certificate data, the digital certificate data including a number of times of forwarding and a first forwarding moment; determining whether following conditions are satisfied: the number of times of the forwarding being less than a preset threshold, or a time length between a current moment and the first forwarding moment being less than a preset time length; and increasing, in response to determining at least one of the conditions being satisfied, the number of times of the forwarding by a preset number, and forwarding the digital certificate data to another proxy server.

In some embodiments, before the determining whether following conditions are satisfied: the number of times of the forwarding being less than a preset threshold, or a time length between a current moment and the first forwarding moment being less than a preset time length, the method further includes: verifying the digital certificate data. The determining whether following conditions are satisfied: the number of times of the forwarding being less than a preset threshold, or a time length between a current moment and the first forwarding moment being less than a preset time length includes: determining, in response to the verification being successful, whether the following conditions are satisfied: the number of times of the forwarding being less than the preset threshold, or the time length between the current moment and the first forwarding moment being less than the preset time length.

In some embodiments, the method further includes: storing the digital certificate data into a shared memory.

In some embodiments, the method further includes: stopping, in response to determining an incapability of communicating with a preset proxy server, receiving a request.

In some embodiments, the method further includes: receiving a request sent by a client, the request including a web address; determining, according to a website domain name to which a digital certificate in a locally stored digital certificate set is bound, a digital certificate matching the web address as a target digital certificate; and processing the request according to the target digital certificate.

In some embodiments, the determining, according to a website domain name to which a digital certificate in a locally stored digital certificate set is bound, a digital certificate matching the web address as a target digital certificate includes: dividing the web address into at least two character strings according to a dot symbol in the web address, to obtain a character string set; and matching, according to a position of a character string in the character string set in the web address, the character string and the website domain name to which the digital certificate in the digital certificate set is bound in a preset order, to determine the target digital certificate.

In some embodiments, the determining, according to a website domain name to which a digital certificate in a locally stored digital certificate set is bound, a digital certificate matching the web address as a target digital certificate includes: determining a digital certificate corresponding to a website domain name identical to the web address according to the website domain name to which the digital certificate in the locally stored digital certificate set is bound.

In some embodiments, a hash code corresponding to the website domain name to which the digital certificate in the digital certificate set is bound is stored in a hash table. The determining, according to a website domain name to which a digital certificate in a locally stored digital certificate set is bound, a digital certificate matching the web address as a target digital certificate includes: performing a hash calculation on the web address to obtain a hash code; determining a hash code in the hash table matching the hash code corresponding to the web address as a target hash code; and determining a digital certificate corresponding to the target hash code as the target digital certificate.

In a second aspect, some embodiments of the present disclosure provide an apparatus for updating a digital certificate. The apparatus includes: a data receiving unit, configured to receive digital certificate data, the digital certificate data including a number of times of forwarding and a first forwarding moment; an ascertaining unit, configured to determine whether following conditions are satisfied: the number of times of the forwarding being less than a preset threshold, or a time length between a current moment and the first forwarding moment being less than a preset time length; and a forwarding unit, configured to increase, in response to determining at least one of the conditions being satisfied, the number of times of the forwarding by a preset number, and forward the digital certificate data to another proxy server.

In some embodiments, the apparatus further includes: a verifying unit, configured to verify the digital certificate data, before the ascertaining unit determines whether the following conditions are satisfied: the number of times of the forwarding being less than the preset threshold, or the time length between the current moment and the first forwarding moment being less than the preset time length. The ascertaining unit is further configured to: determine, in response to the verification being successful, whether the following conditions are satisfied: the number of times of the forwarding being less than the preset threshold, or the time length between the current moment and the first forwarding moment being less than the preset time length.

In some embodiments, the apparatus further includes: a storing unit, configured to store the digital certificate data into a shared memory.

In some embodiments, the apparatus further includes: a stopping unit, configured to stop, in response to determining an incapability of communicating with a preset proxy server, receiving a request.

In some embodiments, the apparatus further includes: a request receiving unit, configured to receive a request sent by a client, the request including a web address; a determining unit, configured to determine, according to a website domain name to which a digital certificate in a locally stored digital certificate set is bound, a digital certificate matching the web address as a target digital certificate; and a processing unit, configured to process the request according to the target digital certificate.

In some embodiments, the determining unit is further configured to: divide the web address into at least two character strings according to a dot symbol in the web address, to obtain a character string set; and match, according to a position of a character string in the character string set in the web address, the character string and the website domain name to which the digital certificate in the digital certificate set is bound in a preset order, to determine the target digital certificate.

In some embodiments, the determining unit is further configured to: determine a digital certificate corresponding to a website domain name identical to the web address according to the website domain name to which the digital certificate in the locally stored digital certificate set is bound.

In some embodiments, a hash code corresponding to the website domain name to which the digital certificate in the digital certificate set is bound is stored in a hash table. The determining unit is further configured to: perform a hash calculation on the web address to obtain a hash code; determine a hash code in the hash table matching the hash code corresponding to the web address as a target hash code; and determine a digital certificate corresponding to the target hash code as the target digital certificate.

In a third aspect, some embodiments of the present disclosure provide a proxy server. The proxy server includes: one or more processors; and a storage device, configured to store one or more programs. The one or more programs, when executed by the one or more processors, cause the one or more processors to implement the method described in any embodiment in the first aspect.

In a fourth aspect, some embodiments of the present disclosure provide a computer readable medium storing a computer program. The program, when executed by a processor, implements the method described in any embodiment in the first aspect.

According to the method and apparatus for updating a digital certificate provided by some embodiments of the present disclosure, the digital certificate data may first be received, the digital certificate data including the number of times of the forwarding and the first forwarding moment. Then, whether the conditions (the number of times of the forwarding being less than a preset threshold, or a time length between a current moment and the first forwarding moment being less than a preset time length) are satisfied is determined. Finally, in response to determining the at least one of the conditions being satisfied, the number of times of the forwarding is increased by the preset number, and the digital certificate data is forwarded to the another proxy server. According to the method in some embodiments, the received digital certificate may be forwarded to another proxy server, which improves the forwarding efficiency of the digital certificate, and can restrict the number of times of forwarding the digital certificate at the same time, thereby avoiding a network storm.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail by combining the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
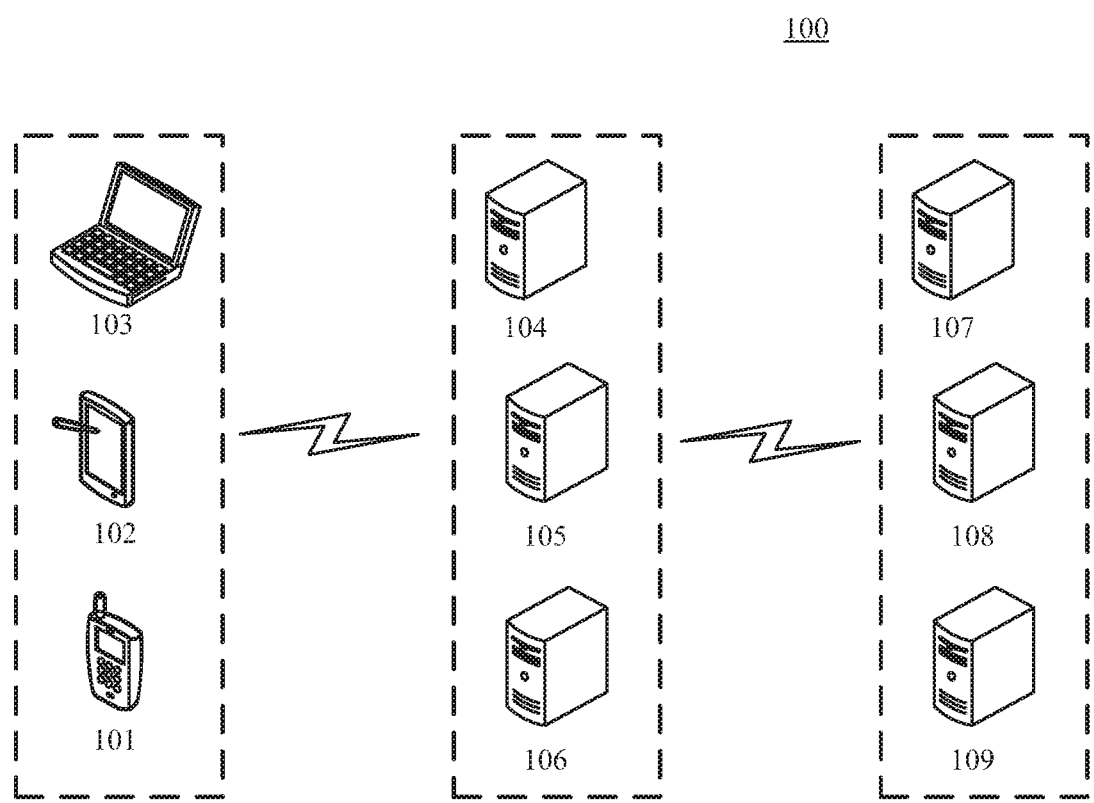
FIG. 1 is a diagram of an example system architecture in which an embodiment of the present disclosure may be implemented.

FIG. 1 shows an example system architecture 100 in which a method for updating a digital certificate or an apparatus for updating a digital certificate according to an embodiment of the present disclosure may be implemented.

As shown in FIG. 1, the system architecture 100 may include terminal devices 101, 102 and 103, proxy servers 104, 105 and 106, and a server 107. Connections between the terminal devices 101, 102 and 103 and the proxy server 107 and between the proxy server 107 and the server 107 may be established via a network. The network may include various types of connections, for example, wired or wireless communication links, or optical fiber cables.

A user may interact with the proxy servers 104, 105 and 106 via the network by using the terminal devices 101, 102 and 103, to receive or send messages. Various communication client applications (e.g., a web browser application, a shopping application, a search application, an instant communication tool, a mailbox client and social platform software) may be installed on the terminal devices 101, 102 and 103.

The terminal devices 101, 102 and 103 may be hardware or software. When being the hardware, the terminal devices 101, 102 and 103 may be various electronic devices having a display screen and supporting webpage browsing, the electronic devices including, but not limited to, a smart phone, a tablet computer, an e-book reader, an MP3 (moving picture experts group audio layer III) player, an MP4 (moving picture experts group audio layer IV) player, a laptop portable computer and a desktop computer. When being the software, the terminal devices 101, 102 and 103 may be installed in the above-listed electronic devices. The terminal devices may be implemented as a plurality of pieces of software or a plurality of software modules (e.g., software or software modules for providing a distributed service), or as a single piece of software or a single software module, which will not be specifically defined here.

The proxy servers 104, 105 and 106 may be servers providing a proxy service, and the servers may establish an indirect connection between the terminal devices 101, 102 and 103 and the server 107. The proxy servers 104, 105 and 106 may receive a request sent by the terminal devices 101, 102, 103, and find the corresponding digital certificate according to a proxy protocol, to process the request.

The server 107 may be a server providing various kinds of services, for example, a backend server providing an update for the digital certificate requested by the proxy servers 104, 105 and 106. The server 107 may send the updated digital certificate to the proxy servers 104, 105 and 106.

It should be noted that the proxy servers 104, 105 and 106 and the server 107 may be hardware or software. When being the hardware, the proxy servers 104, 105 and 106 and the server 107 may be implemented as a distributed server cluster/distributed device cluster composed of a plurality of servers, or as a single server/single device. When being the software, the proxy servers 104, 105 and 106 and the server 107 may be implemented as a plurality of pieces of software or a plurality of software modules (e.g., software or software modules for providing a distributed service), or as a single piece of software or a single software module, which will not be specifically defined here.

It should be noted that the method for updating a digital certificate provided by some embodiments of the present disclosure is generally performed by the proxy servers 104, 105 and 106. Correspondingly, the apparatus for updating a digital certificate is generally provided in the proxy servers 104, 105 and 106.

It should be appreciated that the numbers of the terminal devices, the networks, the proxy servers and the servers in FIG. 1 are merely illustrative. Any number of terminal devices, networks, proxy servers and servers may be provided based on actual requirements.

Figure 2:
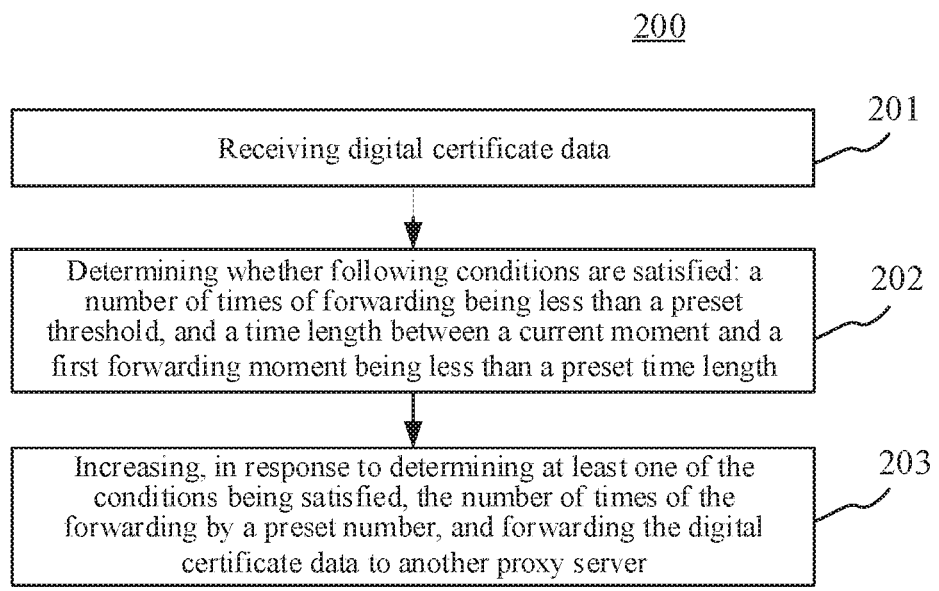
FIG. 2 is a flowchart of a method for updating a digital certificate according to an embodiment of the present disclosure.

Further referring to FIG. 2, FIG. 2 illustrates a flow 200 of a method for updating a digital certificate according to an embodiment of the present disclosure. The method for updating a digital certificate in this embodiment includes the following steps.

Step 201, receiving digital certificate data.

In this embodiment, an executing body (e.g., the proxy servers 104, 105 and 106 shown in FIG. 1) of the method for updating a digital certificate may receive, from a server (e.g., the server 107 shown in FIG. 1) or other proxy servers (e.g., the proxy servers 104, 105 and 106 shown in FIG. 1), the digital certificate data by means of a wired or wireless connection. The proxy server may refer to Nginx, and Nginx is a lightweight web server/reverse proxy server.

The digital certificate data may include a digital certificate, a number of times of forwarding, and a first forwarding moment. The digital certificate is a series of digits indicating identity information of communication parties in the Internet communication, and provides an approach to verifying the identity of a communication entity communicating on the Internet. The digital certificate may include an SSL certificate, and the SSL certificate may be installed on the server or the proxy server for proving the identity of the server and communication encryption. The SSL certificate may be bound to a website domain name, and the website domain name is the name of a certain computer or computer group, the name consisting of a list of names separated by a dot.

The number of times of the forwarding is used to represent the number of times of the forwarding of the digital certificate. It may be understood that when the digital certificate is sent to a proxy server by a server or another proxy server, it may be considered that the digital certificate is forwarded. The first forwarding moment may be used to represent the moment when the digital certificate is forwarded for the first time.

It should be noted that the wireless connection may include, but not limited to, a 3G/4G connection, a WiFi connection, a Bluetooth connection, a WiMAX connection, a Zigbee connection, an UWB (ultra wideband) connection, and other wireless connections now known or developed in the future.

Step 202, determining whether following conditions are satisfied: a number of times of forwarding being less than a preset threshold, or a time length between a current moment and a first forwarding moment being less than a preset time length.

According to the number of times of the forwarding and the first forwarding moment in the digital certificate data, the executing body may determine whether the following conditions are satisfied: the number of times of the forwarding being less than the preset threshold, or the time length between the current moment and the first forwarding moment being less than the preset time length. In this embodiment, the preset threshold may be preset by a technician. The proxy server may forward the digital certificate to another proxy server. Therefore, in order to avoid a network storm, in this embodiment, the forwarding of the digital certificate may be restricted by setting the threshold of the number of times of the forwarding. At the same time, the technician may further preset the preset time length to restrict the forwarding of the digital certificate. When determining that at least one of the above conditions is satisfied, the executing body may perform step 203.

Step 203, increasing, in response to determining at least one of the conditions being satisfied, the number of times of the forwarding by a preset number, and forwarding the digital certificate data to another proxy server.

In this embodiment, when determining that the at least one of the above conditions is satisfied, the executing body may increase the number of times of the forwarding by the preset value, and forward the digital certificate to another proxy server. The preset value may be 1. When forwarding the digital certificate, the executing body may forward the digital certificate to at least one proxy server. It may be understood that if the digital certificate is received from another proxy server by the executing body, when forwarding the digital certificate, the executing body does not send the digital certificate to the proxy server that forwards the digital certificate to the executing body.

In some alternative implementations of this embodiment, the digital certificate data may further include a digital certificate identifier. Before step 202, the above method may further include the following step not shown in FIG. 2: verifying the digital certificate data.

In this implementation, after receiving the digital certificate data, the executing body may verify the digital certificate data to ensure the security of the digital certificate data, so as to avoid the error of the digital certificate data during the transmission. Specifically, the executing body may verify the digital certificate data through a Merkle tree or a cyclic redundancy check (CRC). The executing body may perform a hash calculation on the digital certificate identifier to obtain a hash code of each digital certificate identifier. Then, the each hash code is arranged in the order of the digital certificate identifier, and each hash code is used as a leaf node to obtain a binary tree. The executing body may further store the binary tree. After receiving new digital certificate data, the executing body may perform the hash calculation on the digital certificate identifier in the new digital certificate data to obtain a new hash code. Finally, the new hash code is used as a new leaf node to update the binary tree. In this way, when the verification is performed, it is only necessary to perform the verification according to the hash value of a root node to confirm whether the digital certificate data is accurate.

Correspondingly, the executing body may perform step 202 after determining that the verification is successful.

In some alternative implementations of this embodiment, the method may further include the following step not shown in FIG. 2: storing the digital certificate data into a shared memory.

For Nginx, it includes a main process and a plurality of sub-processes. Here, main process is used to process the start and the exit of Nginx. A sub-process is used to process a request of a terminal device and forward the request to the server. The executing body stores the digital certificate data in the shared memory. In this way, other sub-processes may acquire, in the shared memory, the digital certificate.

Figure 3:
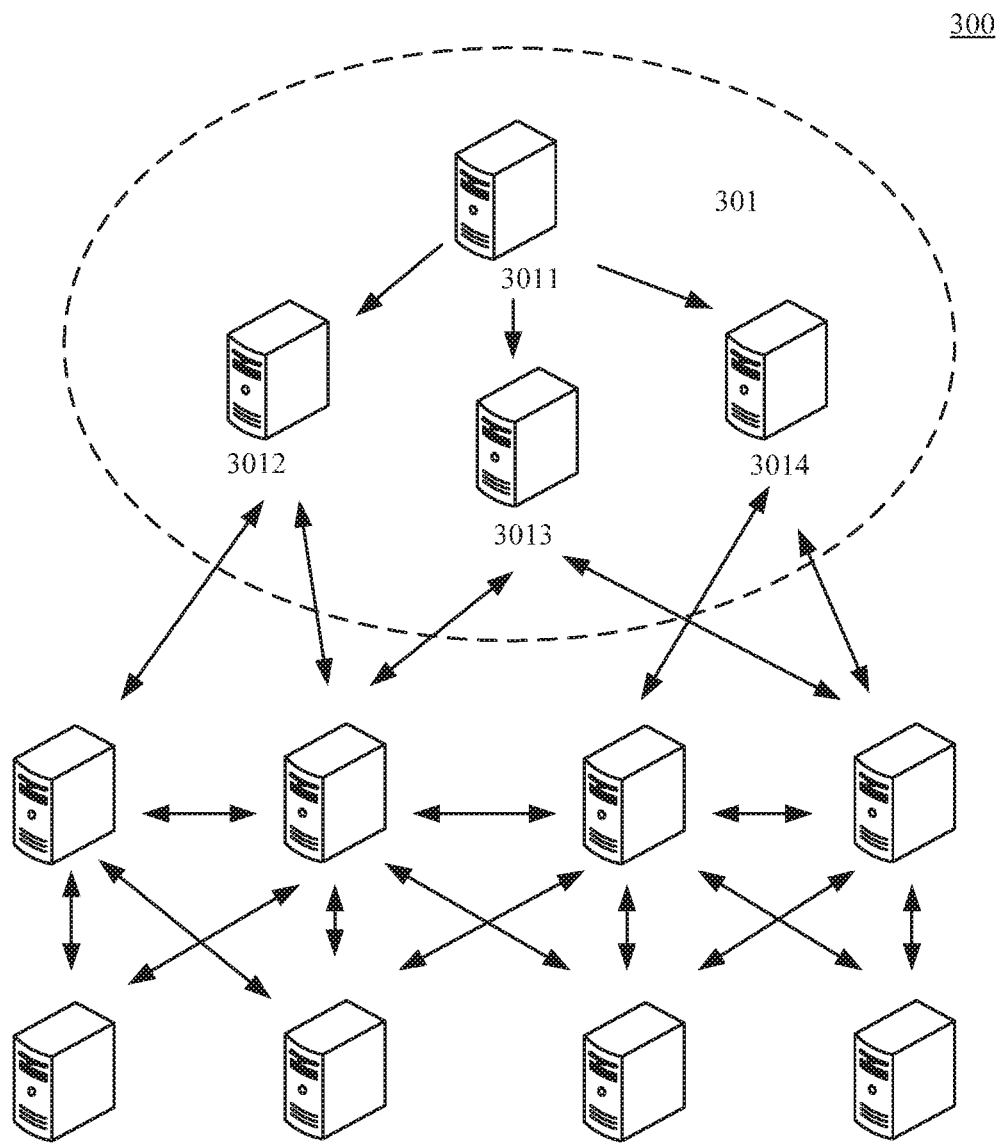
FIG. 3 is a diagram of a system architecture of a proxy server in which the method for updating a digital certificate according to an embodiment of the present disclosure is implemented.

Referring to FIG. 3, FIG. 3 is a diagram of a system architecture of a proxy server in which the method for updating a digital certificate according to an embodiment of the present disclosure is applied. As shown in FIG. 3, the system architecture 300 may include a proxy service cluster. A proxy server in the proxy server cluster may run a consistency algorithm, for selecting, from the proxy server cluster, a plurality of proxy servers responsible for updating the digital certificate, to form a control group 301. Then, a master proxy server (leader) 3011 is selected through a Raft protocol, and other proxy servers in the control group 301 are used as slave proxy servers (followers) 3012, 3013 and 3014. The master proxy server may receive the updated digital certificate uploaded by the technician and then send the updated digital certificate to a slave proxy server in the control group. The slave proxy server may forward the updated digital certificate to another proxy server outside the control group. The Raft protocol may ensure the consistency between the digital certificate stored on the master proxy server in the control group and the digital certificate stored on the slave proxy servers.

Based on the architecture, in some alternative implementations of this embodiment, the method may further include the following step not shown in FIG. 2: stopping, in response to determining an incapability of communicating with a preset proxy server, receiving a request.

In this implementation, the preset proxy server may be a slave proxy server in the control group. When the executing body is incapable of communicating with the slave proxy server, the executing body may stop receiving the request. Specifically, the executing body may determine, in a various ways, that the executing body itself is incapable of communicating with the slave proxy server. For example, the executing body may periodically send a message to the slave proxy server. If the response message is not received within the preset time length, it is determined that the executing body is incapable of communicating with the slave proxy server.

According to the method for updating a digital certificate provided by the above embodiment of the present disclosure, the digital certificate data may first be received, the digital certificate data including the number of times of the forwarding and the first forwarding moment. Then, whether the conditions (the number of times of the forwarding being less than the preset threshold, or the time length between the current moment and the first forwarding moment being less than the preset time length) are satisfied is determined. Finally, in response to determining the at least one of the conditions being satisfied, the number of times of the forwarding is increased by the preset number, and the digital certificate data is forwarded to another proxy server. In the method of this embodiment, the received digital certificate may be forwarded to another proxy server, which improves the forwarding efficiency of the digital certificate, and can restrict the number of times of forwarding the digital certificate at the same time, thereby avoiding the network storm.

Figure 4:
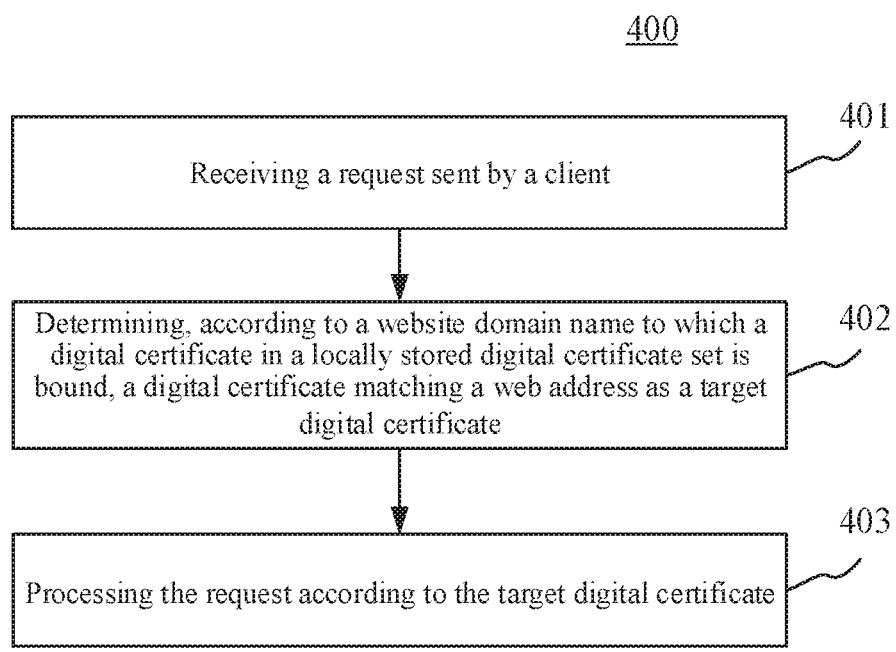
FIG. 4 is a flowchart of the method for updating a digital certificate according to another embodiment of the present disclosure.

Further referring to FIG. 4, FIG. 4 illustrates a flow 400 of the method for updating a digital certificate according to another embodiment of the present disclosure. As shown in FIG. 4, the method in this embodiment further includes the following steps.

Step 401, receiving a request sent by a client.

In this embodiment, an executing body (e.g., the proxy server 105 shown in FIG. 1) of the method for updating a digital certificate may receive, from the client (e.g., the terminal devices 101, 102 and 103 shown in FIG. 1), the request by means of a wired or wireless connection. The request may be an HTTP request. The request may include a web address. In practice, the web address is generally represented by a uniform resource locator (URL).

Step 402, determining, according to a website domain name to which a digital certificate in a locally stored digital certificate set is bound, a digital certificate matching a web address as a target digital certificate.

In this embodiment, the executing body may locally store the digital certificate set, and may further store the website domain name to which each digital certificate in the digital certificate set is bound. The executing body may determine, from bound website domain names, the digital certificate matching the web address as the target digital certificate in various ways.

In some alternative implementations of this embodiment, the executing body may implement step 402 through the following step not shown in FIG. 4: determining a digital certificate corresponding to a website domain name identical to the web address, according to the website domain name to which the digital certificate in the locally stored digital certificate set is bound.

In this implementation, the executing body may first perform "full matching" on the website domain name to which the digital certificate is bound. So-called "full matching" refers to that the website domain name to which the digital certificate is bound is completely identical to the web address in the request. Then, the digital certificate corresponding to the website domain name and obtained through the "full matching" is used as the target digital certificate.

In some alternative implementations of this embodiment, the body may implement step 402 through the following steps not shown in FIG. 4: dividing the web address into at least two character strings according to a dot symbol in the web address, to obtain a character string set; and matching, according to a position of a character string in the character string set in the web address, the character string and the website domain name to which the digital certificate in the digital certificate set is bound in a preset order, to determine the target digital certificate.

In this implementation, first, the executing body may further divide the web address into the at least two character strings according to the dot symbol in the web address, to obtain the character string set. Then, according to the position of the character string in the character string set in the web address, the character string and the website domain name to which the digital certificate is bound are matched in the preset order, so as to determine the target digital certificate. This matching may be referred to as "broad matching." For example, if the web address is "bj.bcebos.com," the executing body may divide the web address to obtain the character strings "bj," "bcebos" and "com." Then, according to positions of the character strings in the web address, the executing body may match the character strings and the website domain name to which the digital certificate is bound in an order from right to left. That is, the character string "com" is first matched with the website domain name, the character string "bcebos" is then matched with the website domain name, and the character string "bj" is finally matched with the website domain name. The target digital certificate can be determined only when the website domain name matches each character string. If the website domain name does not match at least one character string, the corresponding digital certificate cannot be used as the target digital certificate. For example, the website domain name "test.bj.bcebos.com" may sequentially match the character strings "bj," "bcebos" and "com." For the website domain name "test.bj.bcebos.cam," the character string "cam" does not match the character string "com." Through this implementation, if there is no digital certificate of a website domain name ended with "com," it is only necessary to compare the character string "com" with the website domain name once, to determine that no digital certificate is matched currently.

In some alternative implementations of this embodiment, the executing body may first perform the "full matching" on the website domain name to which the digital certificate is bound. If the digital certificate is not obtained through the "full matching," the "broad matching" may be further performed on the website domain name to which the digital certificate is bound. In this way, the efficiency of the matching may be improved.

In some alternative implementations of this embodiment, a hash code corresponding to the website domain name to which each digital certificate in the digital certificate set is bound is stored in a hash table. The hash code may be obtained by performing a hash calculation on the website domain name. The executing body may further implement step 402 through the following steps not shown in FIG. 4: performing the hash calculation on the web address to obtain a hash code; determining a hash code in the hash table matching the hash code corresponding to the web address as a target hash code; and determining a digital certificate corresponding to the target hash code as the target digital certificate.

In this embodiment, the executing body may first perform the hash calculation on the web address to obtain the hash code. Then, the hash code in the hash table that matches the hash code obtained through the calculation is used as the target hash code. Finally, the executing body may determine that the digital certificate corresponding to the target hash code is the target digital certificate. It may be understood that the executing body may perform the hash calculation on the each character string in the web address to obtain the hash code of the each character string. Then, the target hash code may be determined according to the hash code of the each character string.

Step 403, processing the request according to the target digital certificate.

After determining the target digital certificate, the executing body may process the request according to the target digital certificate. For example, the executing body may determine whether the target digital certificate is valid. If the target digital certificate is valid, the executing body performs a next process. If the target digital certificate is not valid, the executing body rejects the request.

According to the method for updating a digital certificate provided by the above embodiment of the present disclosure, the digital certificate may be locally stored, thereby reducing the time of finding the digital certificate. Meanwhile, the digital certificate is found using the hash code, which may further reduce the time of finding the digital certificate.

Figure 5:
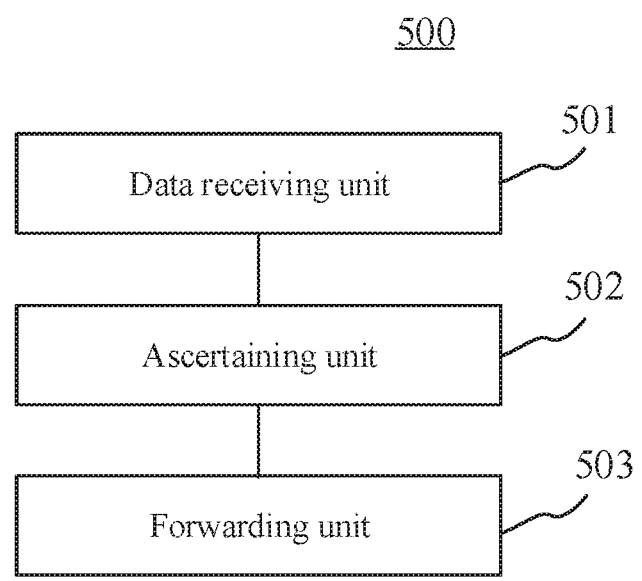
FIG. 5 is a schematic structural diagram of an apparatus for updating a digital certificate according to an embodiment of the present disclosure.

Further referring to FIG. 5, as an implementation of the method shown in the above drawings, an embodiment of the present disclosure provides an apparatus for updating a digital certificate. An embodiment of the apparatus may correspond to the embodiment of the method shown in FIG. 2, and the apparatus may be applied in various electronic devices.

As shown in FIG. 5, the apparatus 500 for updating a digital certificate in this embodiment includes: a data receiving unit 501, an ascertaining unit 502 and a forwarding unit 503.

The data receiving unit 501 is configured to receive digital certificate data. The digital certificate data includes a number of times of forwarding and a first forwarding moment.

The ascertaining unit 502 is configured to determine whether following conditions are satisfied: the number of times of the forwarding being less than a preset threshold, or a time length between a current moment and the first forwarding moment being less than a preset time length.

The forwarding unit 503 is configured to increase, in response to determining at least one of the conditions being satisfied, the number of times of the forwarding by a preset number, and forward the digital certificate data to another proxy server.

In some alternative implementations of this embodiment, the apparatus 500 may further include: a verifying unit (not shown in FIG. 5). The verifying unit is configured to verify the digital certificate data, before the ascertaining unit 502 determines whether the following conditions are satisfied:

the number of times of the forwarding being less than the preset threshold, or the time length between the current moment and the first forwarding moment being less than the preset time length. Correspondingly, the ascertaining unit 502 is further configured to: determine, in response to the verification being successful, whether the following conditions are satisfied: the number of times of the forwarding being less than the preset threshold, or the time length between the current moment and the first forwarding moment being less than the preset time length.

In some alternative implementations of this embodiment, the apparatus 500 may further include: a storing unit (not shown in FIG. 5). The storing unit is configured to store the digital certificate data into a shared memory.

In some alternative implementations of this embodiment, the apparatus 500 may further include: a stopping unit (not shown in FIG. 5). The stopping unit is configured to stop, in response to determining an incapability of communicating with a preset proxy server, receiving a request.

In some alternative implementations of this embodiment, the apparatus 500 may further include: a request receiving unit, a determining unit and a processing unit that are not shown in FIG. 5.

The request receiving unit is configured to receive a request sent by a client. The request includes a web address.

The determining unit is configured to determine, according to a website domain name to which a digital certificate in a locally stored digital certificate set is bound, a digital certificate matching the web address as a target digital certificate.

The processing unit is configured to process the request according to the target digital certificate.

In some alternative implementations of this embodiment, the determining unit may be further configured to: divide the web address into at least two character strings according to a dot symbol in the web address, to obtain a character string set; and match, according to a position of a character string in the character string set in the web address, the character string and the website domain name to which the digital certificate in the digital certificate set is bound in a preset order, to determine the target digital certificate.

In some alternative implementations of this embodiment, the determining unit may be further configured to: determine a digital certificate corresponding to a website domain name identical to the web address according to the website domain name to which the digital certificate in the locally stored digital certificate set is bound.

In some alternative implementations of this embodiment, a hash code corresponding to the website domain name to which the digital certificate in the digital certificate set is bound is stored in a hash table. The determining unit may be further configured to: perform a hash calculation on the web address to obtain a hash code; determine a hash code in the hash table matching the hash code corresponding to the web address as a target hash code; and determine a digital certificate corresponding to the target hash code as the target digital certificate.

According to the apparatus for updating a digital certificate provided by the above embodiment of the present disclosure, the received digital certificate may be forwarded to another proxy server, which improves the forwarding efficiency of the digital certificate, and can restrict the number of times of forwarding the digital certificate at the same time, thereby avoiding a network storm.

It should be understood that, the units 501-503 described in the apparatus 500 for updating a digital certificate respectively correspond to the respective steps in the method described with reference to FIG. 2. Thus, the operations and features described above for the method for updating a digital certificate are also applicable to the apparatus 500 and the units contained therein, which will not be repeatedly described here.

Figure 6:
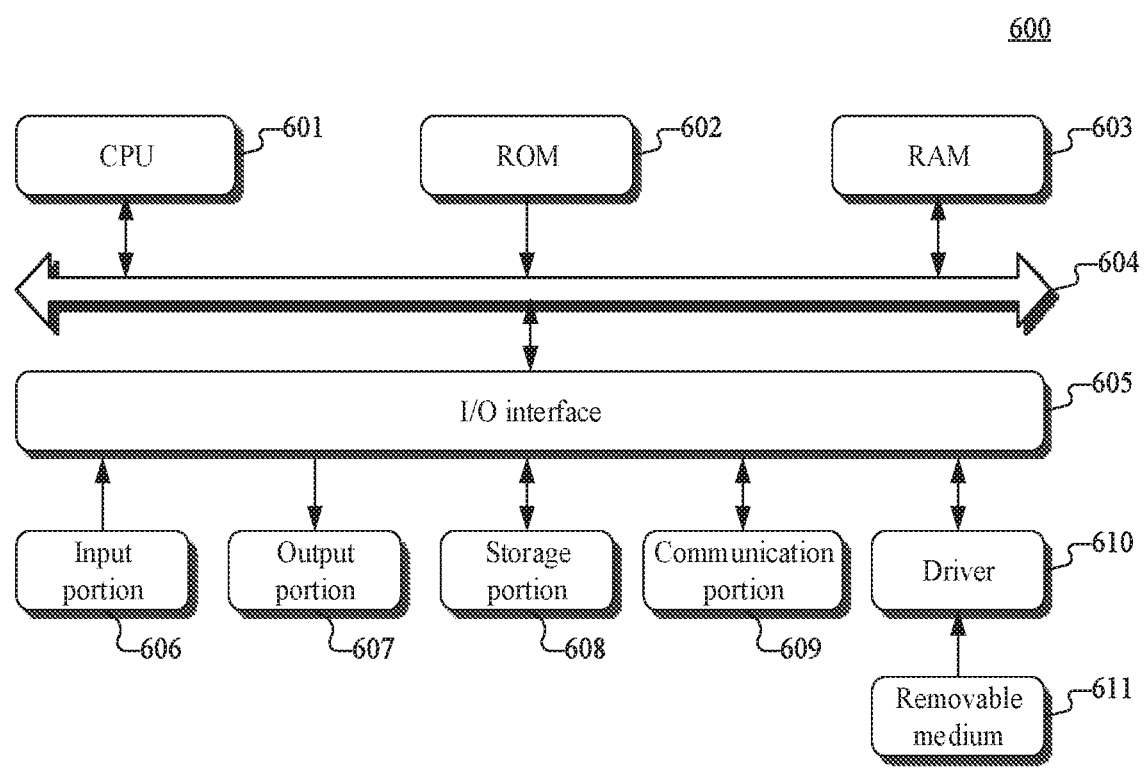
FIG. 6 is a schematic structural diagram of a computer system adapted to implement the proxy server according to some embodiments of the present disclosure.

Referring to FIG. 6, FIG. 6 is a schematic structural diagram of a computer system 600 adapted to implement a proxy server of some embodiments of the present disclosure. The proxy server shown in FIG. 6 is merely an example, and should not bring any limitations to the functions and the scope of use of some embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker, etc.; a storage portion 608 including a hard disk and the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to some embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the methods of some embodiments of the present disclosure.

It should be noted that the computer readable medium in some embodiments of the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above.

In some embodiments of the present disclosure, the computer readable storage medium may be any physical medium containing or storing programs, which may be used by a command execution system, apparatus or element or incorporated thereto. In some embodiments of the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

A computer program code for executing the operations according to some embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of dedicated hardware and computer instructions.

The units involved in some embodiments of the present disclosure may be implemented by means of software or hardware. The described units may also be provided in a processor. For example, the processor may be described as: a processor comprising a data receiving unit, an ascertaining unit and a forwarding unit. The names of these units do not in some cases constitute a limitation to such units themselves. For example, the data receiving unit may alternatively be described as "a unit for receiving digital certificate data."

In another aspect, some embodiments of the present disclosure further provide a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: receive digital certificate data, the digital certificate data including a number of times of forwarding and a first forwarding moment; determine whether following conditions are satisfied: the number of times of the forwarding being less than a preset threshold, or a time length between a current moment and the first forwarding moment being less than a preset time length; and increase, in response to determining at least one of the conditions being satisfied, the number of times of the forwarding by a preset number, and forward the digital certificate data to another proxy server.

The above description is only an explanation for embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for updating a digital certificate, applied in a proxy server, the method comprising:
   receiving digital certificate data, the digital certificate data including a number of times of forwarding and a first forwarding moment;
   determining whether the following conditions are satisfied: the number of times of the forwarding being less than a preset threshold, or a time length between a current moment and the first forwarding moment being less than a preset time length;
   increasing, in response to determining at least one of the conditions being satisfied, the number of times of the forwarding by a preset number, and forwarding the digital certificate data to another proxy server;
   receiving a request sent by a client, the request including a first web address, wherein the first web address includes a plurality of character strings and at least one dot, and the plurality of character strings and the at least one dot are sequentially arranged;
   comparing the first web address with at least one website domain name bounding with at least one locally stored digital certificate;
   determining a target website domain name matching the first web address;
   determining a target digital certificate bounding with the target website domain name; and
   processing the request according to the target digital certificate.

2. The method according to claim 1, wherein before the step of determining whether the following conditions are satisfied: the number of times of the forwarding being less than a preset threshold, or a time length between a current moment and the first forwarding moment being less than a preset time length, the method further comprises:
  verifying the digital certificate data, and
  then determining whether the following conditions are satisfied: the number of times of the forwarding being less than a preset threshold, or a time length between a current moment and the first forwarding moment being less than a preset time length includes:
    determining, in response to the verification being successful, whether the following conditions are satisfied: the number of times of the forwarding being less than the preset threshold, or the time length between the current moment and the first forwarding moment being less than the preset time length.

3. The method according to claim 1, further comprising: storing the digital certificate data into a shared memory.

4. The method according to claim 1, further comprising: stopping, in response to determining an incapability of communicating with a preset proxy server, receiving a request.

5. The method according to claim 1, wherein the plurality of character strings of the first web address is divided by the at least one dot, and comparing the first web address with at least one website domain name bounding with at least one locally stored digital certificate and determining a target website domain name matching the first web address comprises:
  comparing a last character string arranged after a last dot of the at least one dot in the first web address with a last character string of a first website domain name of the at least one website domain name;
  determining that the last character string in the first web address does not match the last character string of the first website domain name;
  determining that the first web address does not match the first website domain name, in response se to determining that the last character string in the first web address does not match the last character string of the first website domain name;
  determining that each of the character strings in the first web address matches a respective character string of a second website domain name of the at least one website domain name; and
  determining, the second website domain name as a target website domain name.

6. The method according to claim 1, wherein the determining a target website domain name matching the first web address comprises:
  determining a website domain name identical to the first web address as the target website domain name.

7. The method according to claim 1, wherein a hash code corresponding to the at least one website domain name bounding with the at least one locally stored digital certificate is stored in a hash table, and
  the comparing the first web address with at least one website domain name bounding with at least one locally stored digital certificate, determining a target website domain name matching the first web address, and determining a target digital certificate bounding with the target website domain name comprises:
  performing a hash calculation on the web address to obtain a hash code;
  determining a hash code in the hash table matching the hash code corresponding to the web address as a target hash code; and
  determining a digital certificate corresponding to the target hash code as the target digital certificate.

8. An apparatus for updating a digital certificate, provided in a proxy server, the apparatus comprising:
  at least one processor; and
  a memory storing instructions, the instructions when executed by the at least one processor, cause the at least one processor to perform operations, the operations comprising:
  receiving digital certificate data, the digital certificate data including a number of times of forwarding and a first forwarding moment;
  determining whether following conditions are satisfied: the number of times of the forwarding being less than a preset threshold, or a time length between a current moment and the first forwarding moment being less than a preset time length;
  increasing, in response to determining at least one of the conditions being satisfied, the number of times of the forwarding by a preset number, and forward the digital certificate data to another proxy server;
  receiving a request sent by a client, the request including a first web address, wherein the web address includes a plurality of character strings and at least one dot, and the plurality of character strings and the at least one dot are sequentially arranged;
  comparing the first web address with at least one website domain name bounding with at least one locally stored digital certificate;
  determining a target website domain name matching the first web address;
  determining a target digital certificate bounding with the target website domain name; and
  processing the request according to the target digital certificate.

9. The apparatus according to claim 8, the operations further comprising:
  verifying the digital certificate data, before determining whether the following conditions are satisfied: the number of times of the forwarding being less than the preset threshold, or the time length between the current moment and the first forwarding moment being less than the preset time length;
  wherein the determining whether following conditions are satisfied: the number of times of the forwarding being less than a preset threshold, or a time length between a current moment and the first forwarding moment being less than a preset time length includes:
    determining, in response to the verification being successful, whether the following conditions are satisfied: the number of times of the forwarding being less than the preset threshold, or the time length between the current moment and the first forwarding moment being less than the preset time length.

10. The apparatus according to claim 8, the operations further comprising:
  storing the digital certificate data into a shared memory.

11. The apparatus according to claim 8, the operations further comprising:
  stopping, in response to determining an incapability of communicating with a preset proxy server, receiving a request.

12. The apparatus according to claim 8, wherein the plurality of character strings of the first web address is divided by the at least one dot, and comparing the first web address with at least one website domain name bounding with at least one locally stored digital certificate and determining a target website domain name matching the first web address comprises;

comparing a last character string arranged after a last dot of the at least one dot in the first web address with a last character string of a first website domain name of the at least one website domain name;

determining that the last character string in the first web address does not match the last character string of the first website domain name;

determining that the first web address does not match the first website domain name, in response to determining that the last character string in the first web address does not match the last character string of the first website domain name;

determining that each of the character strings in the first web address matches a respective character string of a second website domain name of the at least one website domain name; and determining the second website domain name as a target website domain name.

13. The apparatus according to claim 8, wherein determining a target website domain name matching the first web address comprises: determining a website domain name identical to the first web address as the target website domain name.

14. The apparatus according to claim 8, wherein a hash code corresponding to the at least one website domain name bounding with the at least one locally digital certificate is stored in a hash table, and wherein the comparing the first web address with at least one website domain name bounding with at least one locally stored digital certificate, determining a target website domain name matching the first web address, and determining a target digital certificate bounding with the target website domain name comprises:

performing a hash calculation on the web address to obtain a hash code;

determining a hash code in the hash table matching the hash code corresponding to the web address as a target hash code; and determining a digital certificate corresponding to the target hash code as the target digital certificate.

15. A non-transitory computer readable medium, storing a computer program, wherein the computer program, when executed by a processor, causes the processor to perform operations, the operations comprising:

receiving digital certificate data, the digital certificate data including a number of times of forwarding and a first forwarding moment;

determining whether the following conditions are satisfied: the number of times of the forwarding being less than a preset threshold, or a time length between a current moment and the first forwarding moment being less than a preset time length;

increasing, in response to determining at least one of the conditions being satisfied, the number of times of the forwarding by a preset number, and forwarding the digital certificate data to another proxy server;

receiving a request sent by a client, the request including a first web address, wherein the first web address includes a plurality of character strings and at least one dot, and the plurality of character strings and the at least one dot are sequentially arranged;

comparing the first web address with at least one website domain name bounding with at least one locally stored digital certificate;

determining a target website domain name matching the first web address;

determining a target digital certificate bounding with the target website domain name; and processing the request according to the tar et digital certificate.

\* \* \* \* \*

UNITED STATES PATENT AND TRADEMARK OFFICE
CERTIFICATE OF CORRECTION

| | |
|---|---|
| PATENT NO. | : 11,368,297 B2 |
| APPLICATION NO. | : 16/564057 |
| DATED | : June 21, 2022 |
| INVENTOR(S) | : Huangjun Shi et al. |

It is certified that error appears in the above-identified patent and that said Letters Patent is hereby corrected as shown below:

In the Claims

Column 15, Line 41, Claim 5, delete "response se" and insert -- response --

Column 15, Line 49, Claim 5, delete "determining," and insert -- determining --

Column 16, Line 26, Claim 8, delete "the" and insert -- the first --

Column 17, Line 5, Claim 12, delete "comprises;" and insert -- comprises: --

Column 18, Line 36, Claim 15, delete "tar et" and insert -- target --

Signed and Sealed this
Twentieth Day of September, 2022

Katherine Kelly Vidal
*Director of the United States Patent and Trademark Office*